United States Patent
Zanetti

(10) Patent No.: US 10,413,111 B2
(45) Date of Patent: Sep. 17, 2019

(54) DEVICE FOR THE PREPARATION OF A BEVERAGE

(71) Applicant: Hausbrandt Trieste 1892 SPA, Nervesa della Battaglia (TV) (IT)

(72) Inventor: Fabrizio Zanetti, Villorba (IT)

(73) Assignee: HAUSBRANDT TRIESTE 1892 S.P.A., Nervesa Della Battaglia (Treviso) (IT)

( * ) Notice: Subject to any disclaimer, the term of this patent is extended or adjusted under 35 U.S.C. 154(b) by 325 days.

(21) Appl. No.: 14/402,805

(22) PCT Filed: Sep. 21, 2012

(86) PCT No.: PCT/IB2012/055028
§ 371 (c)(1),
(2) Date: Nov. 21, 2014

(87) PCT Pub. No.: WO2013/175275
PCT Pub. Date: Nov. 28, 2013

(65) Prior Publication Data
US 2015/0128813 A1   May 14, 2015

(30) Foreign Application Priority Data

May 25, 2012   (IT) .............................. TV2012A0098

(51) Int. Cl.
*A47J 31/06* (2006.01)
*A47J 31/44* (2006.01)

(52) U.S. Cl.
CPC ....... *A47J 31/0642* (2013.01); *A47J 31/4496* (2013.01)

(58) Field of Classification Search
CPC ....... B65D 85/8043; A47J 31/02; A23G 9/045
USPC ..... 99/285, 295, 302 R, 307, 290, 300, 323, 99/483, 323.1
See application file for complete search history.

(56) References Cited

U.S. PATENT DOCUMENTS

| 3,831,629 | A | * | 8/1974 | Mackal | ............. | A61M 25/1018 137/535 |
| 4,602,655 | A | * | 7/1986 | Mackal | ................. | A61M 39/24 137/515 |
| 4,681,132 | A | * | 7/1987 | Lardner | ............... | A61M 39/24 137/271 |

(Continued)

FOREIGN PATENT DOCUMENTS

| CN | 201523987 U | 7/2010 |
| EP | 0919171 A1 | 6/1999 |

(Continued)

OTHER PUBLICATIONS

PCT International Search Report and Written Opinion dated Jan. 2, 2013, from which the instant application is based, 8 pgs.

*Primary Examiner* — Jimmy Chou
(74) *Attorney, Agent, or Firm* — Fredrikson & Byron, P.A.

(57) ABSTRACT

A device for the preparation of a beverage includes a beverage supply duct and a closure element. The closure element includes a closing surface suitable for closing at least partially an end of the supply duct. The device is characterized in that the closure element is made of elastomer material suitable for undergoing an elastic deformation under the thrust of the beverage being supplied. The deformation causes an at least partial movement of the closing surface away from the end of the supply duct.

19 Claims, 6 Drawing Sheets

(56) References Cited

U.S. PATENT DOCUMENTS

| | | | | |
|---|---|---|---|---|
| 4,945,824 | A | * | 8/1990 | Borgmann ........... A47J 31/4489 261/121.1 |
| 5,372,061 | A | * | 12/1994 | Albert ..................... A47J 31/56 99/281 |
| 5,578,059 | A | * | 11/1996 | Patzer ................. A61M 39/045 251/149.1 |
| 6,158,328 | A | * | 12/2000 | Cai ..................... A47J 31/4485 261/DIG. 76 |
| 7,077,296 | B2 | * | 7/2006 | Brown ............... B65D 47/2031 220/203.08 |
| 7,150,219 | B2 | * | 12/2006 | De'Longhi ......... A47J 31/4496 99/299 |
| 7,681,492 | B2 | * | 3/2010 | Suggi Liverani .. B65D 85/8043 426/115 |
| 7,703,381 | B2 | * | 4/2010 | Liverani ............. A47J 31/3695 99/295 |
| 7,815,953 | B2 | * | 10/2010 | Mastropasqua .... B65D 85/8043 426/433 |
| 2001/0050002 | A1 | * | 12/2001 | Bonanno ............. A47J 31/0663 99/275 |
| 2002/0078831 | A1 | * | 6/2002 | Cai ......................... A47J 31/14 99/295 |
| 2003/0116028 | A1 | * | 6/2003 | Manuel ............... A47J 31/0684 99/279 |
| 2005/0268789 | A1 | * | 12/2005 | Mazzer .................... A47J 42/40 99/279 |
| 2007/0062375 | A1 | * | 3/2007 | Liverani ............ B65D 85/8043 99/279 |
| 2007/0175335 | A1 | * | 8/2007 | Liverani ............ B65D 85/8043 99/279 |
| 2007/0186784 | A1 | * | 8/2007 | Liverani ............. A47J 31/0668 99/295 |
| 2007/0261564 | A1 | * | 11/2007 | Suggi Liverani ..... A47J 31/002 99/279 |
| 2008/0115675 | A1 | * | 5/2008 | Suggi Liverani ... A47J 31/0663 99/289 R |
| 2008/0229933 | A1 | * | 9/2008 | Morin ................. A47J 31/0605 99/302 R |
| 2008/0257165 | A1 | * | 10/2008 | Bolzicco ............ B65D 85/8043 99/295 |
| 2010/0089921 | A1 | * | 4/2010 | Ellenkamp-Van Olst ................... B65D 47/0809 220/254.3 |
| 2010/0180774 | A1 | * | 7/2010 | Kollep ............... B65D 85/8043 99/295 |
| 2011/0030732 | A1 | * | 2/2011 | Boussemart ........... A47J 31/60 134/18 |
| 2011/0315024 | A1 | * | 12/2011 | Ouriev .................... A23G 1/045 99/485 |
| 2012/0009304 | A1 | * | 1/2012 | Perentes ................. A47J 31/22 426/110 |
| 2012/0097040 | A1 | * | 4/2012 | Levi .................... A47J 31/0663 99/285 |
| 2013/0233179 | A1 | * | 9/2013 | Tien ........................ A47J 31/02 99/323 |
| 2014/0034155 | A1 | * | 2/2014 | Askew .................... F16K 25/00 137/505 |
| 2014/0373725 | A1 | * | 12/2014 | Mastropasqua .... B65D 85/8043 99/295 |

FOREIGN PATENT DOCUMENTS

| | | | |
|---|---|---|---|
| EP | 1016364 | A2 | 7/2000 |
| EP | 1319357 | A2 | 6/2003 |
| FR | 2636828 | A1 | 3/1990 |
| FR | 2655529 | A1 | 6/1991 |
| JP | 2003247659 | A * | 9/2003 |
| TW | 200536502 | A | 11/2005 |
| TW | M296666 | U | 9/2006 |
| TW | M312278 | U | 5/2007 |
| TW | 201127329 | A | 8/2011 |

* cited by examiner

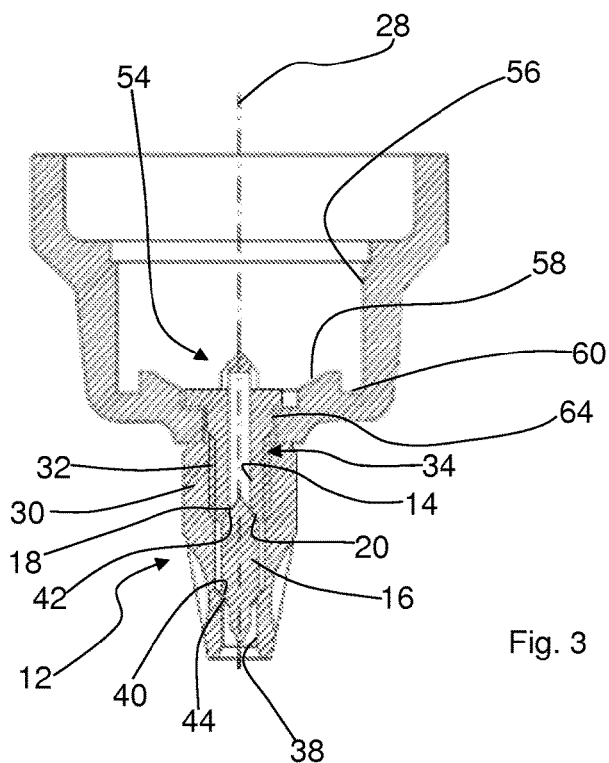
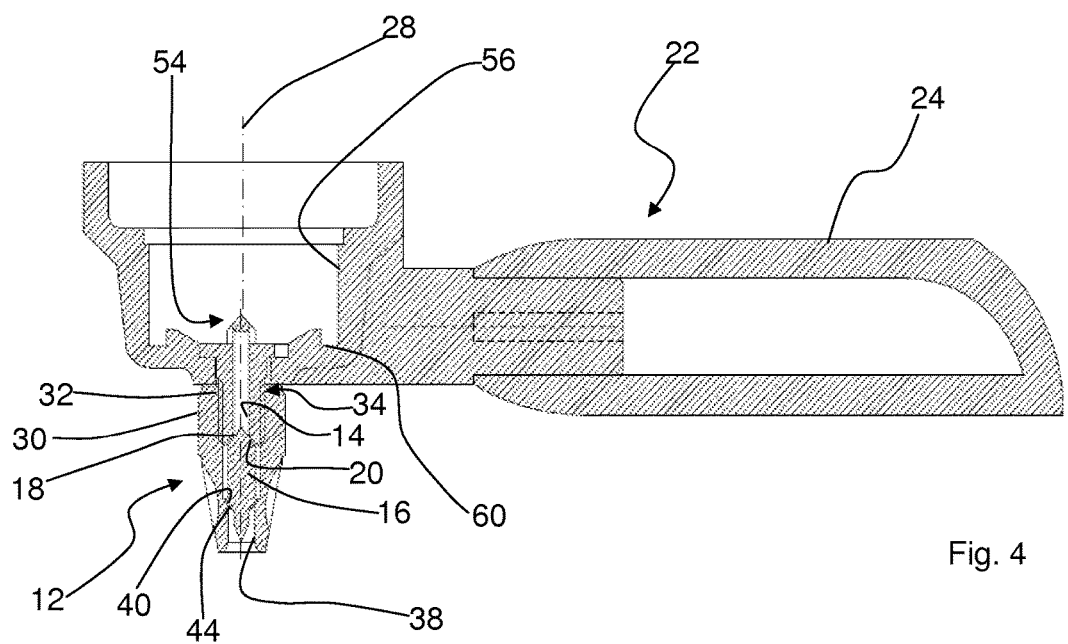

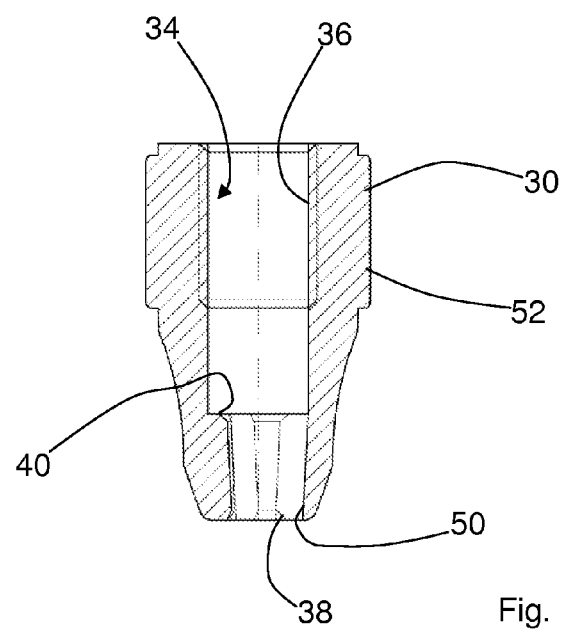
Fig. 7
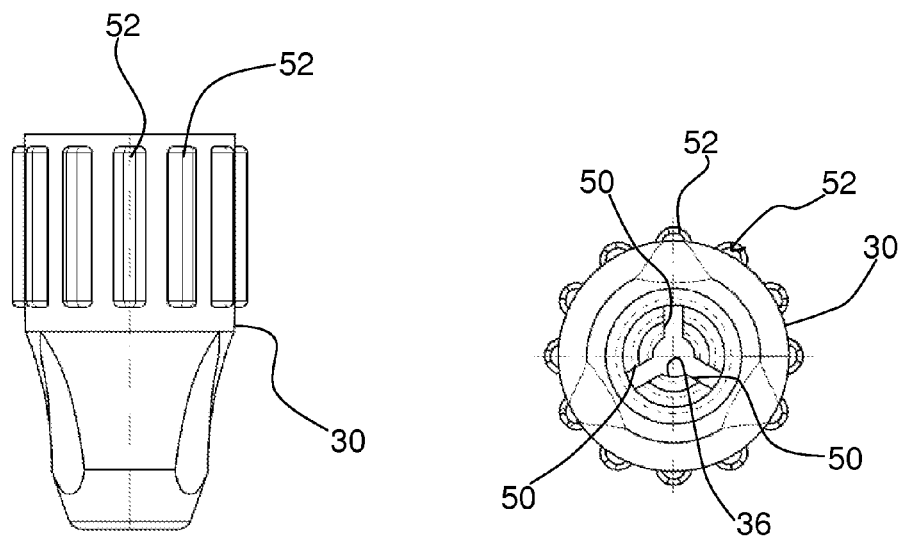
Fig. 8
Fig. 9

DEVICE FOR THE PREPARATION OF A BEVERAGE

FIELD OF THE INVENTION

The present invention relates to a device for the preparation of a beverage.

The device for the preparation of a beverage according to the present invention may be used for the preparation of any beverage obtained by means of percolation or infusion. It may be advantageously used for the preparation of coffee, barley coffee, tea and infusions.

In the description below particular reference will be made to coffee, it being clearly understood, however, that the present invention may also be advantageously used for the beverages indicated above.

BACKGROUND

As is known, the coffee-based beverage is usually obtained by means of percolation of pressurised hot water which passes through a layer of coffee powder. The coffee powder is normally obtained by toasting and then grinding the coffee beans.

In professional espresso coffee machines, the coffee powder is placed inside a cavity of a filter holder and subjected to a light pressing action. Then the filter holder is positioned on a machine body which supplies the pressurised hot water to the cavity of the filter holder and the coffee-based beverage flows out of a spout.

There exist moreover a number of machines mainly for domestic use, but also for professional use, which envisage the use of capsules containing a predefined amount of coffee powder. This type of machine is very popular with users since the capsules containing predefined amounts offer numerous advantages compared to loose coffee powder. The main advantage is that it enables one to have a coffee powder which, packaged in a controlled atmosphere, maintains its organoleptic characteristics over long periods of time.

The main characteristics of the coffee beverage (espresso coffee) are: the aroma, the creaminess, the body and the aftertaste.

Some of these characteristics, such as the aroma, the body and the aftertaste, may be decided at the time when the type of coffee powder is chosen, while other characteristics, such as the creaminess, may be decided also during preparation of the coffee beverage.

In this connection some devices which help the user adjust the creaminess of a coffee-based beverage are known in the prior art. These devices essentially consist in a constriction of the spout through which the coffee beverage flows out. The constriction is generally obtained by means of a rigid element which is pushed by a spring against the opening of the spout. The operating principle is simple: the pressure of the beverage supplied opposes the action of the spring and displaces the rigid element from the spout opening, allowing the beverage to pass through. The greater the degree of prestressing of the spring, the higher the pressure of the beverage must be in order to overcome the force of the spring.

The constriction increases the creaminess of the coffee and the user, via prestressing of the spring, has the possibility of adjusting the degree of creaminess.

The prior art, although very popular, is not without drawbacks.

The system is complicated from the point of view of its constructional design, since it is necessary to provide an external element suitable for being screwed onto the spout, a rigid constriction element and a spring suitable for pushing the constriction element against the spout opening. The cleaning operation is not always easy to perform and in particular repositioning of the components of the device is not simple, in view of the relative mating between the spring and the rigid element.

BRIEF SUMMARY OF EMBODIMENTS OF THE INVENTION

The object of the present invention is therefore to overcome, at least partly, the drawbacks of the prior art.

A first task of the present invention is to provide a device for the preparation of espresso coffee which allows the user to adjust easily the degree of creaminess of the espresso coffee.

A second task of the present invention is to provide a device for the preparation of a beverage using a powdery or granular substance, which allows a user to adjust easily the degree of creaminess.

A third task of the present invention is to provide a device which can be easily disassembled, cleaned and reassembled.

The object and the tasks are achieved with a device for the preparation of a beverage according to claim 1.

BRIEF DESCRIPTIONS OF DRAWINGS

The characteristic features and advantages of a device for the preparation of a beverage realized by applying the principles of the invention will emerge more clearly from the description below of a number of examples of embodiment provided by way of a non-limiting example with reference to the accompanying drawings in which:

FIG. 3 shows a cross-sectional view, along a longitudinal section plane, of a capsule-receiving seat of a machine for the preparation of a beverage with a device according to the present invention;

FIG. 4 shows a cross-sectional view, along a longitudinal section plane, of a filter holder provided with a device according to the present invention;

FIG. 7 shows a longitudinal section view of a component of the device according to the present invention;

FIG. 8 shows a front view of the component according to FIG. 7;

FIG. 9 shows a plan view of the component according to FIG. 7;

DETAILED DESCRIPTION OF EMBODIMENTS OF THE INVENTION

Figure 1:
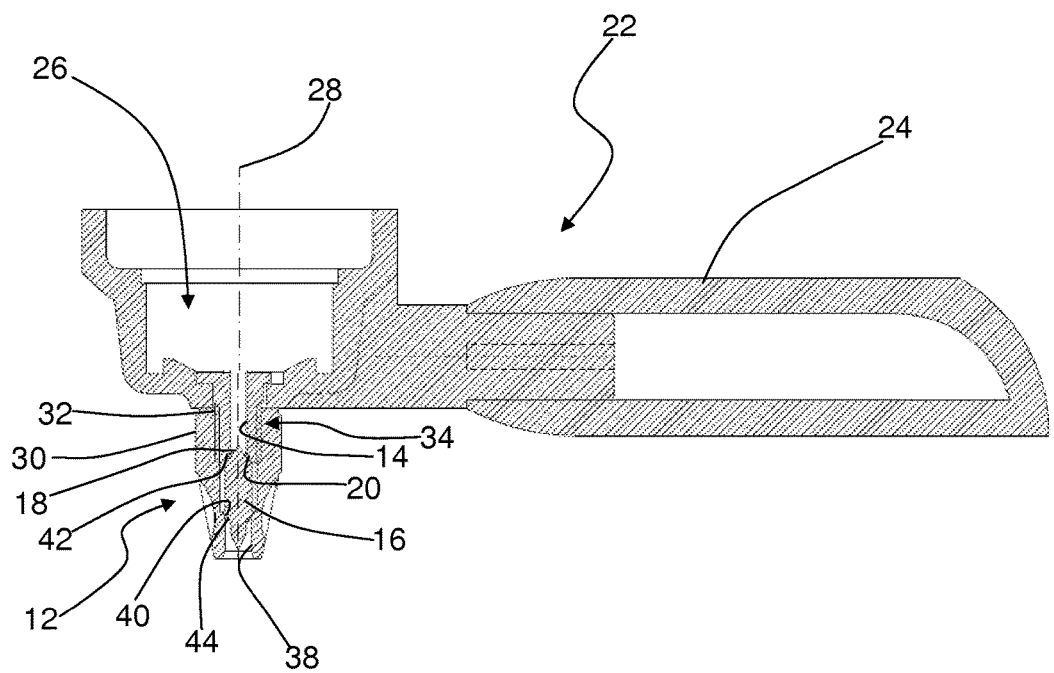
FIG. 1 shows a cross-sectional view, along a longitudinal section plane, of a filter holder provided with a device according to the present invention.
Figure 2:
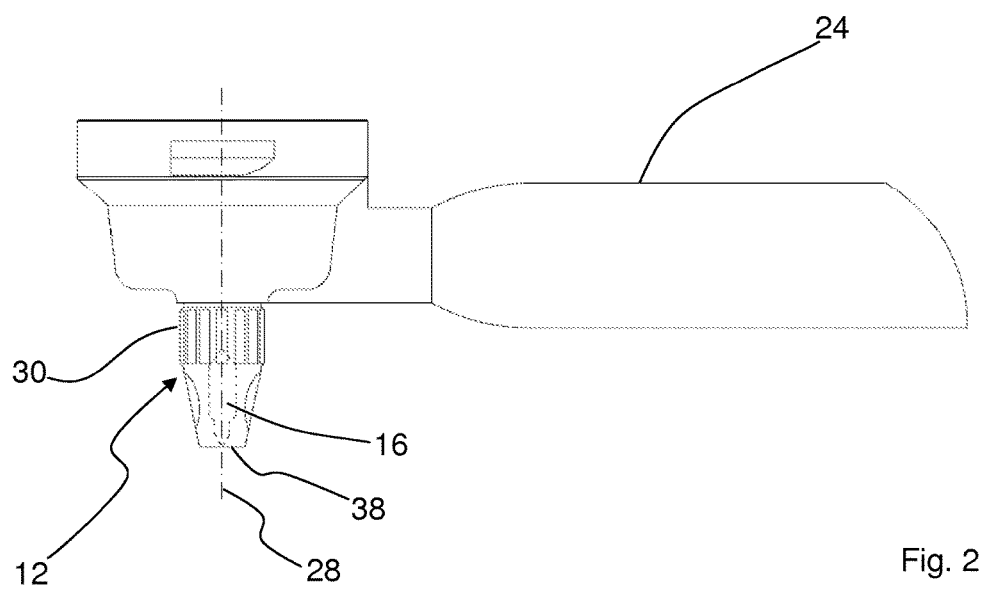
FIG. 2 shows a side view of a filter holder provided with a device according to the present invention.

With reference to FIGS. 1-4, the device 12 for the preparation of a beverage according to the present invention comprises a supply duct 14 for the beverage, and a closure element 16 comprising a closing surface 18 suitable for closing at least partially an end 20 of the supply duct 14. The device 12 according to the present invention is characterized in that the closure element 16 is made of elastomer material suitable for undergoing an elastic deformation under the thrust of the beverage being supplied. The deformation causes an at least partial movement of the closing surface 18 away from the end 20 of the supply duct 14.

In the description below particular reference will be made to the preparation of a coffee-based beverage (espresso coffee), it being clearly understood, however, that the present invention may also be advantageously used for the beverages indicated further above. FIG. 1 shows a first embodiment of the present invention. In particular a filter holder 22 of a professional machine for the preparation of coffee is shown. The filter holder 22, which has a handle 24, is provided with a seat 26 (of the type known per se) suitable for receiving the coffee powder. The bottom of said seat 26 is provided with the supply duct 14 which has a longitudinal axis 28.

In accordance with the embodiment shown in FIG. 1, a spout 30 provided with a through-hole 36 (clearly visible in FIG. 7) terminating in a supply mouth 38 is connected to the supply duct 14, the end 32 of which projects in the longitudinal direction from the bottom of the seat 26. Advantageously, during operation, the through-hole 36 forms an extension of the supply duct 14 so that the beverage which flows out from the supply duct may pass through the through-hole 36 and flow out of the spout 30.

The through-hole 36 acts as a seat for the closure element 16.

The spout 30 is connected to the end 32 via the connection means 34.

According to a possible embodiment of the present invention, said connection means 34 are, for example, an external thread provided on the end 32 of the supply duct 14 and a corresponding internal thread provided on the through-hole 36 of the spout 30. Advantageously, the spout 30 may be screwed onto the end 32 of the supply duct 14.

According to alternative embodiments of the present invention, the connection means 34 may be a snap-engaging joint (not shown and per se obvious for the person skilled in the art) obtained by deformable means provided on the end 32 or on the spout 30.

Advantageously, the spout 30 is adapted to contain the closure element 16, preventing extraction of the closure element 16 from the spout 30 in the beverage supply direction. According to a possible embodiment of the present invention, the through-hole 36 in the vicinity of the supply mouth 38 may comprise a narrowing 40, which is clearly visible in FIG. 7, suitable for preventing extraction of the closure element 16 as described above. According to alternative embodiments, not shown in the figures, the closure element 16 is prevented from being extracted in the beverage supply direction for example by means of a projection or in another manner which can be easily imagined by the person skilled in the art.

The spout 30 according to the present invention is suitable for keeping the closure element 16 in contact with the end 20 of the supply duct 14 so that, under the thrust of a beverage being supplied, the closure element 16 may be deformed and create a passage for the beverage.

According to a possible embodiment of the present invention, via the spout 30 it is possible to adjust the force with which the closure element 16 pushes against the end 20 of the supply duct with its closing surface 18. Advantageously, the force is adjustable in the case where the connection means 34 are of the screwable type (shown in the figures and described further above) by means of greater or lesser screwing of the two components. In other embodiments which are not shown in the figures, but which may be easily imagined by the person skilled in the art, separate adjustments in two or more positions may be provided.

According to a possible embodiment of the present invention, the position of the spout 30 is not adjustable, so as to ensure always the same degree of creaminess of the beverage.

According to a first embodiment of the present invention, the closure element 16 has a body with a cylindrical shape. Advantageously, the external diameter of the closure element 16 is smaller than the diameter of the through-hole 36 so that, during operation, the beverage being supplied may flow between the side surface of the closure element 16 and the surface of the through-hole 36.

According to a possible embodiment of the present invention:
the diameter of the closure element 16 is comprised between 5 and 8 mm; and
the diameter of the through-hole 36 is comprised between 6 and 10 mm.

Advantageously, the distance between the surface of the closure element 16 and the surface of the through-hole 36 is comprised between 0.5 and 2 mm.

Figure 12:
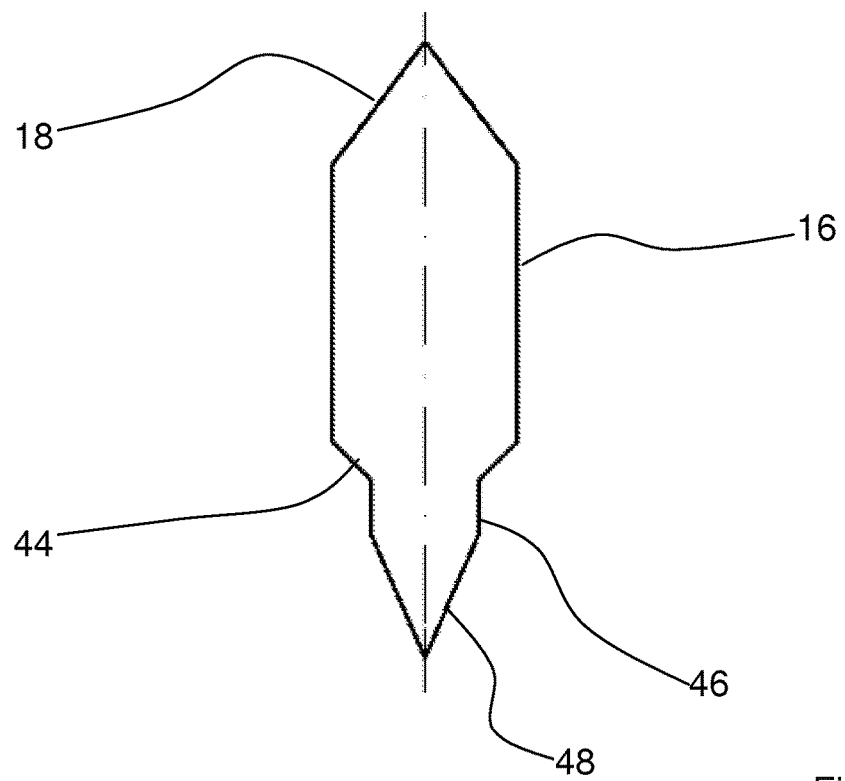
FIG. 12 shows a front view of a component of the device according to the present invention.
Figure 13:
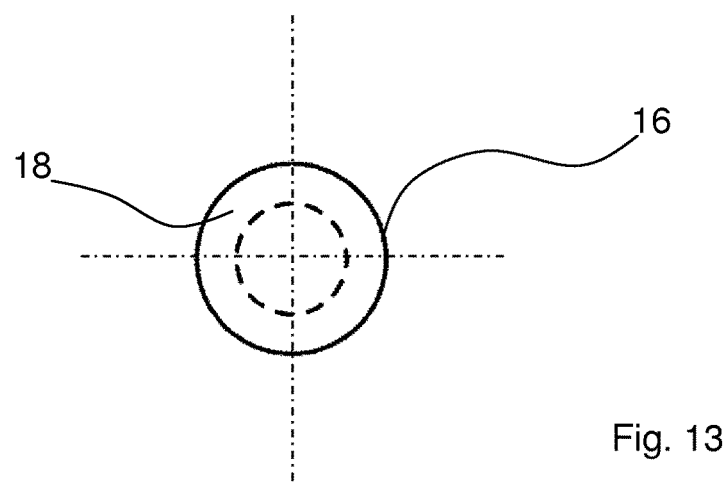
FIG. 13 shows a plan view of the component according to FIG. 12.

According to a possible embodiment of the present invention, shown for example in FIG. 1, the end 32 of the supply duct 14 has a chamfered surface 42 suitable for mating with a corresponding cone-shaped surface provided on the closing surface 18 (as is clearly visible in FIG. 12). In this way it is possible to obtain better guiding of the beverage supplied between the side surface of the closure element 16 and the surface of the through-hole 36.

According to a possible embodiment of the present invention, shown for example in FIGS. 1 and 12, the closure element 16 in the position opposite to the closing surface 18 has a locating surface 44. The locating surface 44, suitable for mating with the narrowing 40 of the spout 30, may be in the form of a truncated cone, with its larger base having a diameter equal to the diameter of the cylindrical part. According to a possible embodiment, shown in FIG. 12, the closure element 16, at the end of the locating surface 44 has a protruding element 46 suitable for insertion inside the supply mouth 38 of the through-hole 36. Advantageously, the protruding element 46, in the vicinity of the locating surface has a cylindrical shape, with a diameter smaller than that of the body of the closure element. According to a possible embodiment, the protruding element 46 may have a cylindrical shape terminating in a tip 48.

Advantageously, the closure element 16 is made of an elastomer material for alimentary use, for example alimentary silicone, but may comprise a vast range of materials which have elastic characteristics, for example alimentary rubbers, polymers, etc.

According to a possible embodiment of the present invention, shown in FIG. 9, the through-hole 36 of the spout 30 in the vicinity of the supply mouth has at least one lateral incision 50. Advantageously, the lateral incisions are three in number and are arranged at a distance of 120° from each other. The lateral incisions have the function of facilitating evacuation of the beverage once it has passed beyond the closure element 16.

According to a possible embodiment of the present invention, the spout may comprise at least one lateral relief 52 suitable for improving gripping of the spout 30 during screwing onto the end 20 of the supply duct 14.

FIGS. 3-6 show alternative embodiments of the present invention suitable for being used with capsules (not shown) containing a granular or powdery substance.

In particular, FIG. 3 shows in diagrammatic form a part of a domestic machine suitable for the production of beverages using a granular or powdery substance contained inside capsules. According to this embodiment, the machine comprises cup-shaped seat 56 for a capsule, with a bottom wall 58. Advantageously, the lowest part of the cup-shaped seat 56 may be provided with a groove 60 in the form of a circular rim, suitable for engagement with a corresponding projection of a capsule. The bottom wall 58 is provided with means 54 for piercing the bottom film of the capsule.

According to a possible embodiment of the present invention, the piercing means 54 comprise an internally hollow pointed pin which is provided with at least one lateral hole 62 for fluid communication between the cup-shaped seat 56 and the supply duct 14.

According to a possible embodiment of the present invention, the piercing means 54 form a single body with the cup-shaped seat 56. According to an alternative embodiment, the piercing means 54 form a component which can be disassembled from the cup-shaped seat 56. For example, in the embodiment shown in FIG. 3, the piercing means 54 can be inserted inside a hole 64 provided inside the cup-shaped seat 56. Advantageously, the hole 64 is shaped so as to match the annular surface 66 (clearly visible in FIG. 10) of the piercing means 54. Advantageously, the shaping is such as to prevent rotation of the piercing means 54 around the main axis of the cup-shaped seat.

Figure 10:
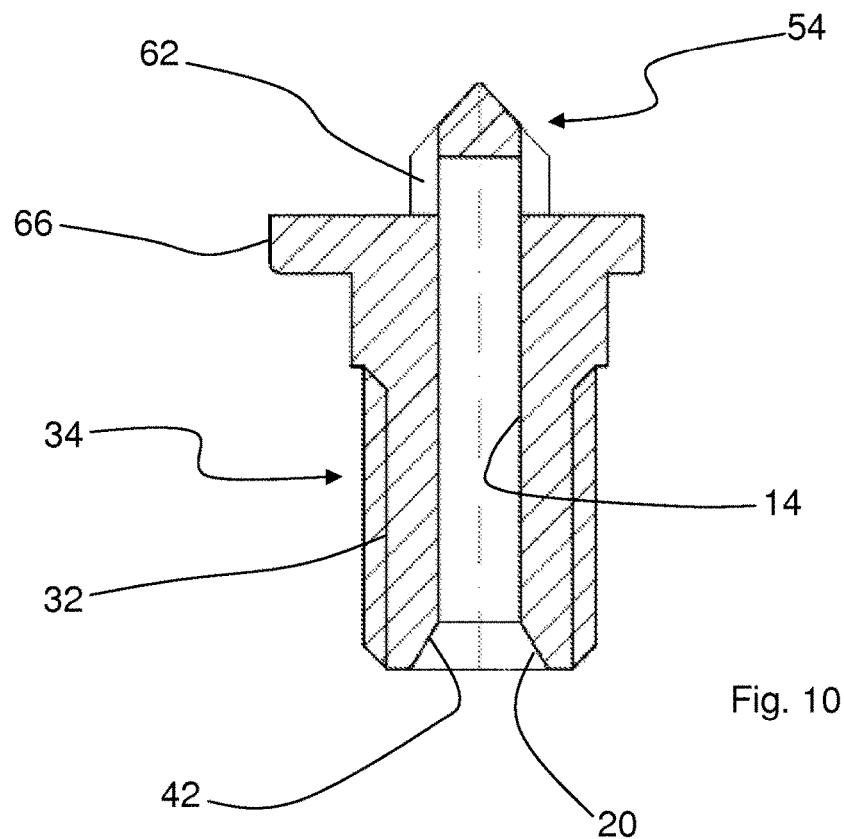
FIG. 10 shows a longitudinally sectioned view of a component of the device according to the present invention.
Figure 11:
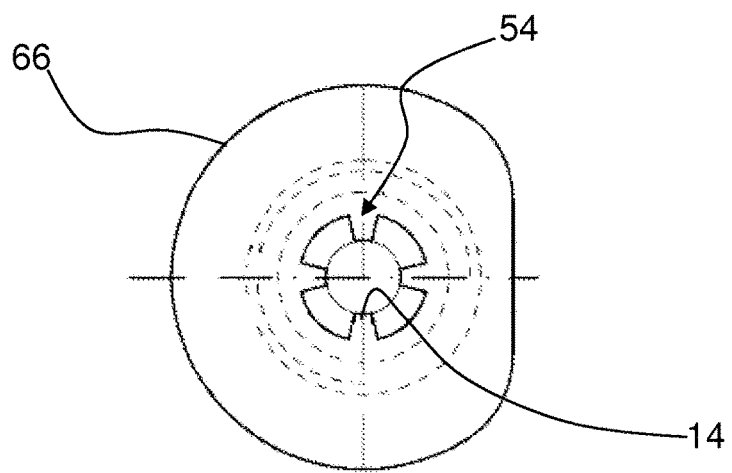
FIG. 11 shows a plan view of the component according to FIG. 10.

According to the embodiment shown for example in FIG. 10, the piercing means also comprise the supply duct 14 and the end 20 to which the spout 30 is connected as described further above.

Figure 6:
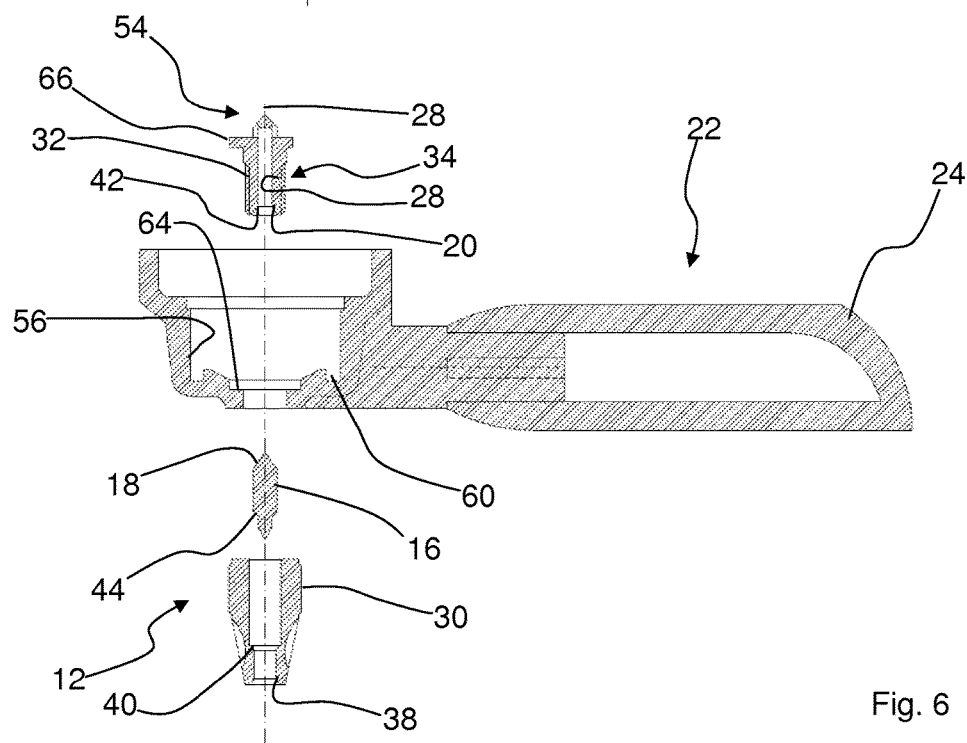
FIG. 6 shows an exploded view of a possible embodiment of the present invention, sectioned along a longitudinally sectioned plane.

FIG. 4 shows a possible embodiment of the present invention in which the device 12 according to the present invention is provided on a filter holder 22 of a professional machine, for the preparation of coffee using a granular or powdery substance contained inside a capsule. FIG. 6 shows the same embodiment of FIG. 4 in the disassembled condition.

With reference again to FIG. 6, a method for assembling an embodiment of the device 12 according to the present invention on a filter holder 22 of a professional coffee machine will now be illustrated.

The piercing means 54 are positioned inside the cup-shaped seat 56 and are inserted into the hole 64 provided on the bottom of the cup-shaped seat 56. Since the hole 64 is shaped so as to match the annular surface 66 provided on the piercing means 54, advantageously the piercing means 54 do not rotate with respect to the cup-shaped seat 56 when they are in the operating position.

The end 20 of the supply duct 14 which has an external thread projects from the bottom of the cup-shaped seat 56.

The closure element 16 is inserted inside the spout 30 and the spout 30 is screwed onto the end 20 of the supply duct 14.

According to an alternative embodiment of the present invention, the spout may be connected to the end 20 of the piercing means 54 via snap-engaging connection means which may be easily imagined by the person skilled in the art.

Figure 5:
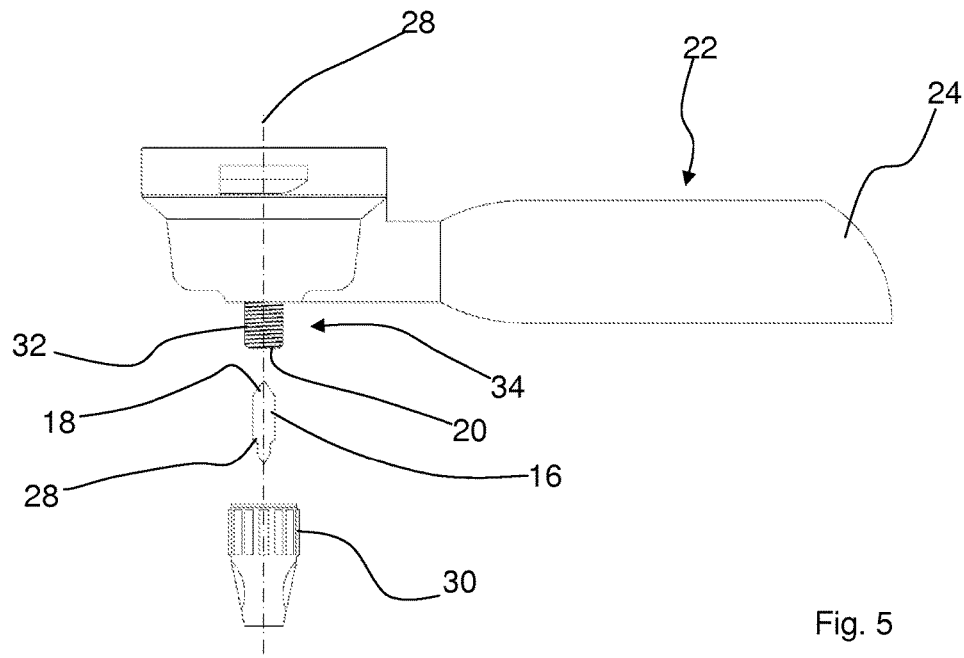
FIG. 5 shows an exploded view of a possible embodiment of the present invention.

According to a possible embodiment of the present invention, the spout 30 may be connected in a manner known per se to a filter holder 22 of the conventional type, suitable for being used with loose coffee powder (see for example FIG. 5). Advantageously, the spout 30 and the closure element 16 are provided on the filter holder 22 in a manner similar to that just described.

The advantages compared to the prior art are therefore clear.

The device according to the present invention allows the user to adjust easily the degree of creaminess of the coffee as desired.

Moreover, the device according to the present invention is simple and composed of few parts which may be easily assembled and disassembled also by non-expert users.

The ease of assembly and disassembly makes the device easy to clean.

With regard to the embodiments described above, the person skilled in the art may, in order to satisfy specific requirements, make modifications to and/or replace elements described with equivalent elements, without thereby departing from the scope of the accompanying claims.

For example, embodiments different from the spout 30 may be envisaged, being provided for example with two external ducts for conveying the espresso coffee into two different cups.

Alternative embodiments of the present invention may also be envisaged where the cross-section of the closure element 16 and the through-hole 36 have a shape different from a circular shape, for example an elliptical, square, rectangular or polygonal shape.

The invention claimed is:

1. A filter holder for a machine for preparation of a beverage, comprising a beverage supply duct, and a closure element comprising a closing surface suitable for closing at least partially an end of said beverage supply duct, said closure element comprising a longitudinal body that extends underneath and along a vertical axis of the beverage supply duct, the longitudinal body being made of an elastomer material suitable for undergoing an elastic deformation under thrust of a beverage being supplied thereat, said elastic deformation causing an at least partial movement of said closing surface away from said end of said beverage supply duct;

wherein the filter holder further comprises a spout, the spout being partially situated around the beverage supply duct and providing a through-hole with a supply mouth, wherein the closure element is seated within the through-hole; and wherein during operation said through-hole forms an extension of the supply duct along the vertical axis and creates a continuous downward pathway for flow of the beverage along the extension, the closure element being removably seated within the through-hole of the spout.

2. The filter holder according to claim 1, characterized in that the through-hole comprises a narrowing in vicinity of the supply mouth, wherein the narrowing is suitable for preventing extraction of the closure element in a beverage supply direction.

3. The filter holder according to claim 1, characterized in that the closure element has a body with a cylindrical shape.

4. The filter holder according to claim 3, characterized in that diameter of the closure element ranges between 5 and 8 mm; and diameter of the through-hole ranges between 6 and 10 mm.

5. The filter holder according to claim 1, characterized in that a cone-shaped surface is provided on the closing surface of the closure element.

6. The filter holder according to claim 5, characterized in that an end of the beverage supply duct has a chamfered surface suitable for mating with a corresponding cone-shaped surface provided on the closing surface of the closure element.

7. The filter holder according to claim 2, characterized in that the closure element has a locating surface in a position opposite to the closing surface, wherein the locating surface is suitable for mating with the narrowing of the through-hole of the spout.

8. The filter holder according to claim 7, characterized in that the closure element comprises a protruding element suitable for insertion inside the supply mouth of the through-hole.

9. The filter holder according to claim 1, characterized in that material from which the closure element is made is alimentary silicone.

10. The filter holder according to claim 1, characterized in that the machine is for the preparation of a coffee-based beverage.

11. A machine for the preparation of espresso coffee, comprising the filter holder according to claim 1.

12. The filter holder according to claim 2, characterized in that the closure element has a body with a cylindrical shape.

13. The filter holder according to claim 1, characterized in that the closure element comprises a protruding element suitable for insertion inside the supply mouth of the through-hole.

14. The filter holder according to claim 2, characterized in that the closure element comprises a protruding element suitable for insertion inside the supply mouth of the through-hole.

15. The filter holder according to claim 1, characterized in that a cone-shaped surface is provided on the closing surface of the closure element, and characterized in that an end of the beverage supply duct has a chamfered surface suitable for mating with a corresponding cone-shaped surface provided on the closing surface of the closure element.

16. The filter holder according to claim 2, characterized in that a cone-shaped surface is provided on the closing surface of the closure element, and characterized in that an end of the beverage supply duct has a chamfered surface suitable for mating with a corresponding cone-shaped surface provided on the closing surface of the closure element.

17. The filter holder according to claim 3, characterized in that a cone-shaped surface is provided on the closing surface of the closure element, and characterized in that an end of the beverage supply duct has a chamfered surface suitable for mating with a corresponding cone-shaped surface provided on the closing surface of the closure element.

18. The filter holder according to claim 4, characterized in that a cone-shaped surface is provided on the closing surface of the closure element, and characterized in that an end of the beverage supply duct has a chamfered surface suitable for mating with a corresponding cone-shaped surface provided on the closing surface of the closure element.

19. The filter holder according to claim 1, characterized in that said deformation defines a pathway for flow of the beverage about an outer surface of the closure element.

* * * * *